United States Patent
Koons et al.

[11] Patent Number: 5,963,281
[45] Date of Patent: Oct. 5, 1999

[54] METHOD FOR FABRICATING AMLCD TILED DISPLAYS WITH CONTROLLED INNER SEAL PERIMETERS

[75] Inventors: John P. Koons, Warrenton, Va.; Donald P. Seraphim, Vestal; Boris Yost, Ithaca, both of N.Y.

[73] Assignee: Rainbow Displays, Inc., Endicott, N.Y.

[21] Appl. No.: 08/949,357

[22] Filed: Oct. 14, 1997

[51] Int. Cl.⁶ .......................... G03F 1/133; G02F 1/1339
[52] U.S. Cl. .......................... 349/73; 349/153; 349/156; 349/190
[58] Field of Search ................ 349/73, 153, 190, 349/156

[56] References Cited

U.S. PATENT DOCUMENTS

| | | | |
|---|---|---|---|
| 4,037,930 | 7/1977 | Matsuyama et al. | 350/343 |
| 4,458,987 | 7/1984 | Sasaki et al. | 349/153 |
| 4,548,475 | 10/1985 | Brendle et al. | 350/334 |
| 4,682,858 | 7/1987 | Kanbe et al. | 349/156 |
| 4,820,025 | 4/1989 | Nakanowatari | 350/334 |
| 5,410,423 | 4/1995 | Furushima et al. | 349/153 |
| 5,576,865 | 11/1996 | Watanabe et al. | 349/153 |
| 5,661,531 | 8/1997 | Greene et al. | 349/73 |
| 5,693,170 | 12/1997 | Li | 156/299 |

FOREIGN PATENT DOCUMENTS

| | | |
|---|---|---|
| 61-194426 | 8/1986 | Japan . |
| 7-318956 | 12/1995 | Japan . |
| 8-146455 | 6/1996 | Japan . |

*Primary Examiner*—William L. Sikes
*Assistant Examiner*—Tarifur R. Chowdhury
*Attorney, Agent, or Firm*—Salzman & Levy

[57] ABSTRACT

Methods of fabricating AMLCD tiled displays are disclosed, in which variations in the width and the SIP location of seals are controlled. The seals can be controlled by using either a trench or a dam that guides the flow and/or the position of the sealing epoxy between the upper and lower glass plates. The purpose of the dam or trench is to prevent the flow of epoxy towards the pixels of the display. The article made by the above method is a substantially flat-panel display (FPD) having a mosaic of individual, hermetically-sealed tiles disposed adjacent one another upon the lower plate or substrate. The tiles have visually imperceptible seams between them. The individual tiles have pixels and edges that are sealed in position, relative to the substrate, by means of a sealing material, such as an epoxy. The dams or trenches are disposed along the individual tiles, adjacent the pixels.

21 Claims, 7 Drawing Sheets

METHOD FOR FABRICATING AMLCD TILED DISPLAYS WITH CONTROLLED INNER SEAL PERIMETERS

RELATED APPLICATION

This application is related to copending U.S. patent application Ser. No. 08/593,759, filed Jan. 29, 1996, for TILED, FLAT-PANEL DISPLAY HAVING INVISIBLE SEAMS.

FIELD OF THE INVENTION

The invention relates to a manufacturing process for fabricating tiled, active matrix liquid crystal displays (AMLCDs) and, more particularly, to a method of sealing AMLCD tiled displays so that they provide a seamless appearance.

BACKGROUND OF THE INVENTION

This invention seeks to establish the location of a seal inner perimeter (SIP) relative to the pixels on the display glass surface containing the color filter (CF) and/or transistor (TFT) of an active matrix liquid crystal display. The method of this invention is similar to processes and methods easily adaptable to, or compatible with, the processes used to make TFT substrates and/or color filters. The inventive design elements are incorporated into the AMLCD display prior to applying the seals. Conventional processes for sealing that are followed by conventional scribe and break technology or alternative finishing methods can then be used to make tiles with adequate tolerances for assembling into displays with a seamless appearance.

There are many requirements in designing a tiled flat panel display with a seamless appearance. The optical design parameters and the mechanical and electrical design parameters have been disclosed in detail in the aforementioned related U.S. application, Ser. No. 08/593,759. That reference teaches that a plurality of color tiles can be adjoined together to form a large, flat-panel display that has a seamless characteristic. In other words, the seams disposed between the tiles are imperceptible to the viewer.

One of the significant requirements for accomplishing the seamless appearance across the interfaces of two neighboring tiles relates to the pitch between pixels crossing a seam. The pitch between two tiles must be nearly equal to all pixel pitches within the tile display. The tolerance level of seam defects to the eye is very dependent on the viewing distance, which in turn is dependent on the pixel pitch. Larger pixel pitches allow more space for the seam components and their tolerances. This space includes the tolerance for waviness of two SIPs, twice the nominal location accuracy of the seal position, the width of two seals, the space allocated for the accuracy of the glass edges, and assembly positioning accuracy.

Thus the accuracy of the orthogonal tolerances of the two tile edges and the location tolerances of the seals and the SIP relative to the pixels must be maintained. In general, all location tolerance references are registered to the pixels, or fiducial marks relative to the pixels, which are accurately placed by the fabrication processes for the AMLCD components. Ideally, the method of positioning the seal should be compatible with that of processing the TFT substrate and/or the CF substrate. This invention describes methods of positioning the seal.

DISCUSSION OF RELATED ART

Several methods are currently used to manufacture seals between the TFT substrates and the cover plates that contain the color filters of AMLCD displays. The seal material, generally epoxy, contains components for viscosity control and spacers for cell gap control. The seal material can either be screened onto the color filter (top glass) or dispensed in the desired patterns from a small orifice, such as a pen or needle. A dispensing program writes a pattern, a wet width and height of seal material (i.e., a volume of seal material), onto the CF plate. Alternatively, patterns, a wet width and height of seal material, may be deposited on the TFT substrate, or on both substrates, depending on desired design and process requirements.

In a screen process, a mesh of fine wire is used to support a photo polymer coating in which the desired patterns are developed. The seal material is then squeegeed through the pattern openings in the screen onto the CF or TFT substrate, or both, to create a wet width and height at a desired location.

Many variables are involved in this process. The most predominant of these is the deformation of the screen in response to the pressure of the squeegee. Deformation changes the position of the pattern in the screen disposed upon the substrate and may produce errors in the SIP location as large as several hundred microns. This deformation also depends on the location of the pattern within the area of the substrate. Additional location errors may result from lack of control of photo polymer thickness, photo polymer pattern inaccuracy, screen registration inaccuracy, screen tension variations, and squeegee pressure and speed.

In order to minimize errors, a trial and error process is used to compensate for the position of screen pattern locations, so that the wet widths of seal material are deposited in the desired locations. In this process, should the location of the wet width be displaced from the desired design position by distance, $+\Delta X$, the pattern for the screen photo polymer in the next iteration is moved in location by $-\Delta X$. Wet width location errors in the Y direction are compensated for in the same way.

In the dispensing process, fewer variables are controlled in order to establish the wet width location on the substrate and the seal material volume. The major variables are: (1) registration of the needle orifice on the substrate, (2) the speed control of the dispense head, and (3) the pressure and viscosity of the seal material.

The CF substrate is laminated to the TFT substrate using a seal material which contains glass, ceramic or polymer spacers. During this process, the seal material is extruded from a wet width to a final width as the CF and TFT plates are squeezed or laminated together. For example, if the wet width is 200 microns, and the wet height of the seal material averages 20 microns, a seal 800 microns wide results after lamination when 5 micron spacers are used. The ratio of the final width to the wet width is called the squeeze ratio (SR). In the above example, the SR is 800/200 or equal to 4. In this example, the lamination process causes the inner perimeter and outer perimeter of the seal each to move by 300 microns. During this process, the SIP becomes wavy. Data show that the waviness which creates a loss of tolerance is increased by increasing squeeze ratios. It is desired in some applications to control this waviness and the nominal position of the SIP. Control of the wet width and the wet height (volume uniformity) is dependent on viscosity and pressure and the speed of the needle across the glass surface during the dispensing process. These factors are very important in determining the position of the SIP.

As noted above, the uniformity or waviness of the SIP is a function of the squeeze ratio. Additional factors such as glass thickness variance, surface profile variance resulting from CF or TFT thin films, and surface wetting angle variances, may also affect SIP uniformity. If these variances cause the SIP to extrude onto the pixels, an optical defect may occur near the seam of the tiled FPD.

In copending U.S. patent application, Ser. No. 08/593,759, the sealing of tiles for flat-panel displays (FPDs) is described. That reference teaches that, for liquid crystal displays and AMLCD flat-panel displays, seals are typically wide. Wide seals are located at the outer perimeter edges of the FPDs and are hidden by the frames and housings of the displays.

Furthermore, the seals are generally located far enough away from the pixels, so that no seal material reaches the pixels. For tiled displays, seals on edges of tiles which are located next to an edge of an adjacent tile may also be as wide as desired, as long as they do not encroach on a pixel. However, the scribing and breaking location of the edges of neighboring tiles or the edge locations created by other means must be positioned accurately within the spacing distance between pixels so that the assembly provides monolithic-like continuity. Appropriate clearance between tiles is also provided to accommodate the tolerances between edges and the assembly tolerances, so that the pixel pitch is approximately uniform across the seam, compatible with the optical designs noted in the aforementiond copending patent application.

The seals are typically achieved using an epoxy adhesive between the CF glass and the TFT glass. Control of the SIP location of these seals is important, as aforementioned. The variation of the width, as well as the seal location, are provided for in the design of the seal. Control of this variation is difficult, because the epoxy adhesive material tends to flow toward pixel arrays interior to the seal, when the glass is adhesive bonded.

SUMMARY OF THE INVENTION

This invention contemplates methods of controlling the variation in the width and the SIP location of a seal for a flat-panel AMLCD display. The seal can be controlled by using a trench, a dam or a controlled wetting surface that guides the flow and/or the position of the sealing epoxy between the TFT and CF glass plates of the AMLCD tiles. The purpose of the dam or trench is to prevent the flow of epoxy into the pixels. The article produced by the inventive method comprises a substantially flat panel display having a mosaic of individual, hermetically sealed tiles disposed adjacent one another between a cover plate and a back plate. The tiles have visually imperceptible seams disposed therebetween as a result of the combination of optical, mechanical, and software designs as noted in the aforementioned copending patent application. The individual tiles have a plurality of pixels and edges that are located by fiducials or alternative means, and bonded in position, relative to cover and back plates by means of a compliant polymer. The dam, trench or preferred wetting surface is disposed on the TFT or CF plates, or both, inside the individual tiles, adjacent to pixel rows and columns on the outer perimeter of the tiles.

It is an object of the present invention to provide an improved means for sealing AMLCD displays.

It is another object of this invention to provide a display, the CF substrate and/or TFT substrate of which comprises a trench, a dam or a preferred wetting surface for guiding the flow of sealant between these substrates.

It is a further object of the invention to provide a tiled display, the CF substrate and/or TFT substrate of which comprises a trench, a dam or a preferred wetting surface for influencing the flow of sealant to the pixels.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components will bear the same designation and numbering throughout the figures.

DESCRIPTION OF THE PREFERRED EMBODIMENT

Generally speaking, the invention features a seamless AMLCD display. The display is constructed in accordance with different embodiments, described herein. Each embodiment is designed to control the variation in the width and the SIP location of a seal. The seal can be controlled by using either a trench or a dam that guides the flow and/or the position of the sealing epoxy between the CF and TFT glass plates. The purpose of the dam or trench is to prevent the flow of epoxy towards the pixels.

Figure 1:
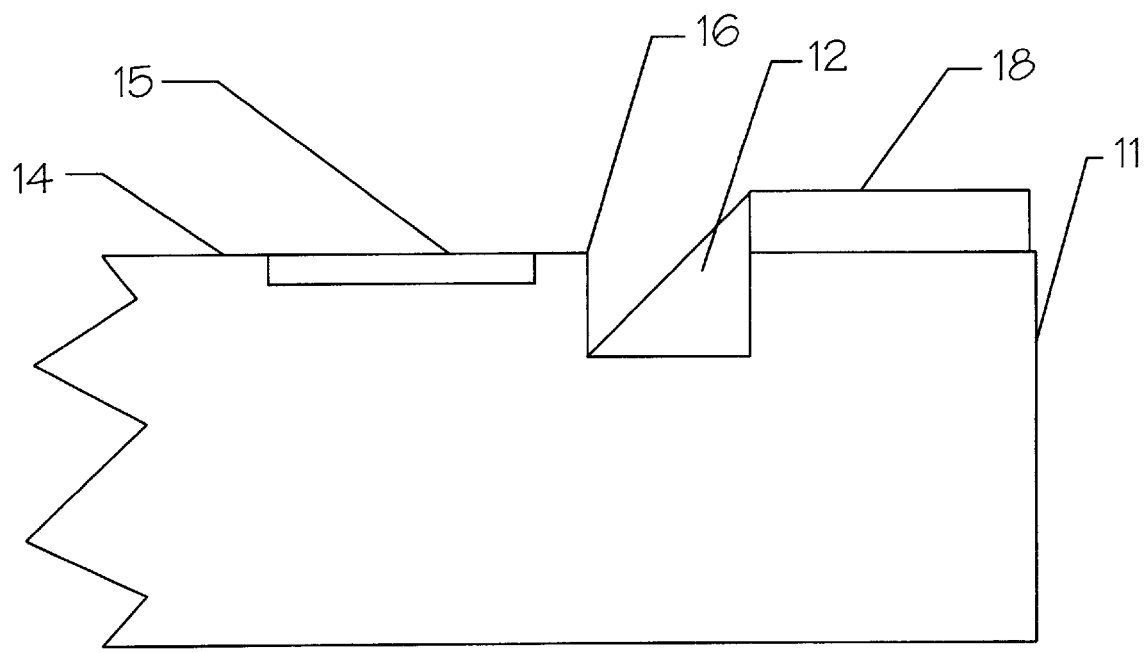
FIG. 1 illustrates a schematic sectional view of a tile used in an AMLCD display and constructed in accordance with this invention.

Now referring to FIG. 1, there is illustrated a schematic sectional view of a tile 10 forming part of a bottom or top glass substrate 11 of an AMLCD display. A trench 12 is disposed upon an inner surface 14 of the tile 10, adjacent a seal 18. The trench 12 is used to guide epoxy sealant 18 that joins the TFT and CF plates of the AMLCD display. The trench 12 may be fabricated in many ways, including, but not limited to scribing, machining or etching. The shape of the trench 12 may be rectangular (as shown in the figure), rounded, triangular, etc. The trench 12 acts as a reservoir to prevent the flow of the epoxy adhesive toward pixels 15 of the tile 10. The trench 12 also acts to interfere with, or retard the flow rate of the epoxy adhesive in the direction of the pixels 15. The inner wall 16 of the very deep trench 12 acts as a SIP.

A more shallow trench 12, in the range of the cell gap thickness, could also be designed to be effective, depending on the position and volume of the wet width of epoxy. In that case, the inner wall 16 of the trench 12 next to the pixels 15 may also act as the SIP. For example, if the SIP flow is 300 microns, for a wide seal, with a 5 micron cell gap, a trench 12 equal in depth to the cell gap and 100 microns wide, neighboring the pixels 15, changes the SIP flow to approximately 150 microns. This type of design decreases the tolerance requirements of seal volume and wet width seal position control for tiles to be used in arrays. In other words, wide seal technology can be used effectively when the SIP is controlled within the AMLCD process by creating trenches of desired shapes and depths.

Trenches may be created without any additional tooling other than masks. The trench-forming processes are compatible with AMLCD technology. One method of creating a trench is to ion etch the glass substrate in a pattern prior to depositing the silicon nitride oxide combination used to passivate the substrate from ubiquitous sodium contamination.

A second sealing method comprises the use of a very thick passivation layer which is masked, and then ion etched, to form the trenches in the passivation layer in desired positions and designs.

Figure 1A:
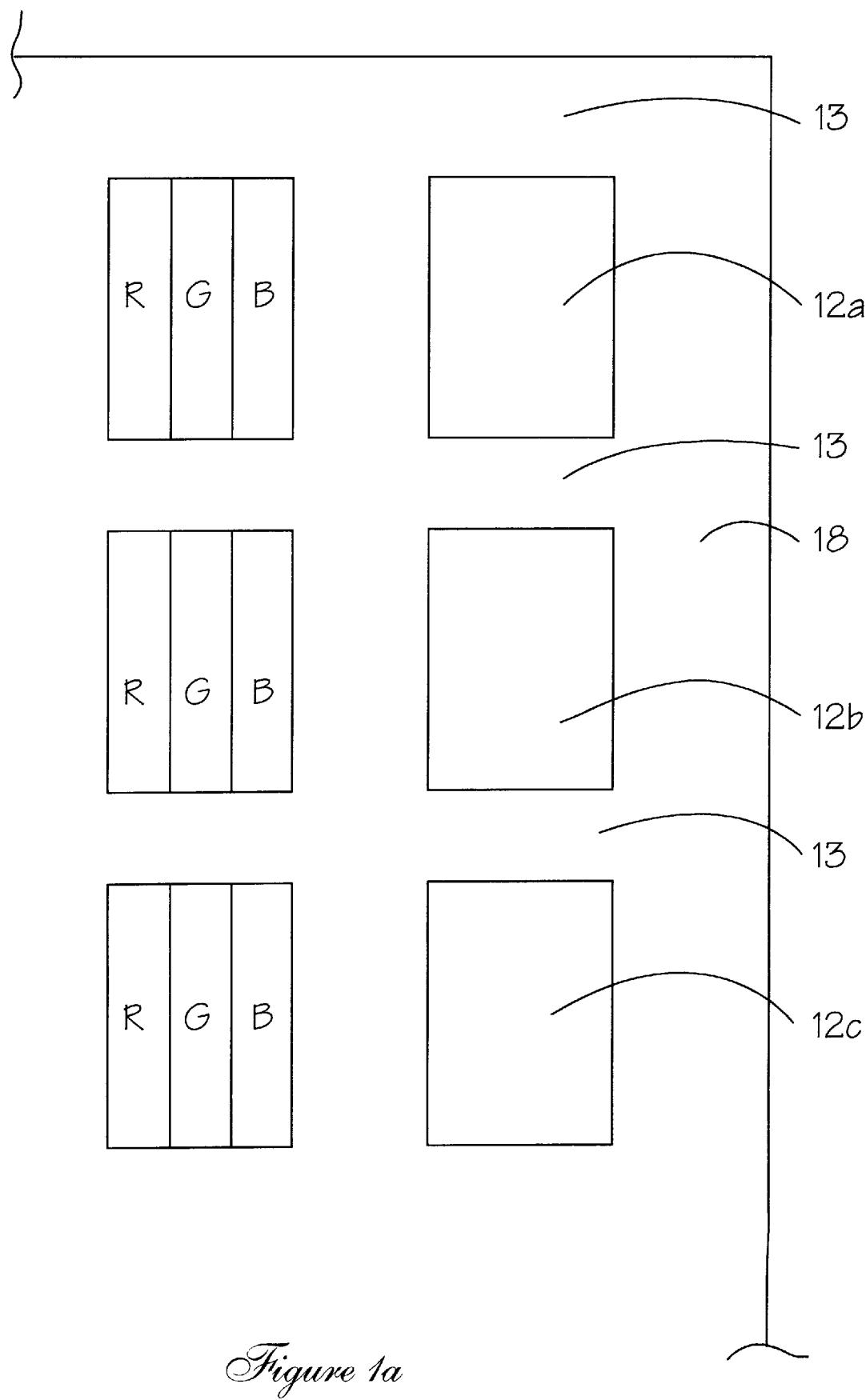
FIG. 1a is a schematic view of an alternate embodiment of a trench structure.

Referring now to FIG. 1a, there is shown an alternate embodiment of trench 12. In this embodiment, trench 12 is intermittent with non-trenched areas 13 shown between trench segments 12a, 12b and 12c.

Figure 2:
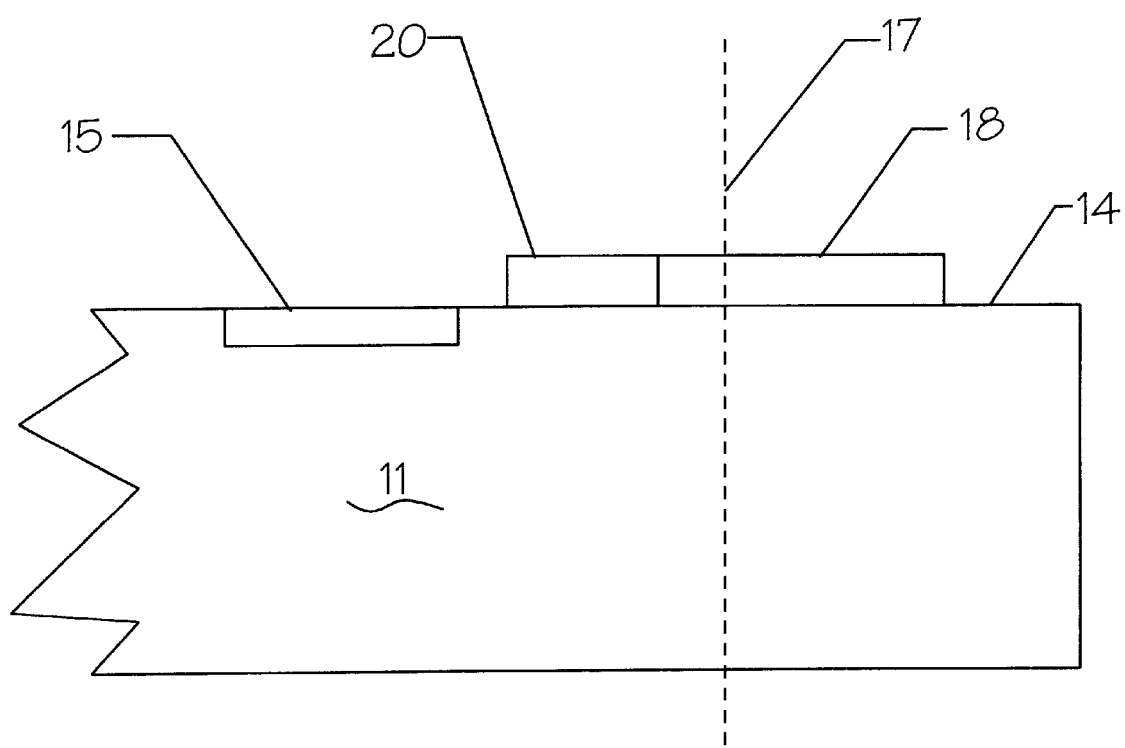
FIG. 2 depicts a schematic sectional view of a tile used in an AMLCD display and having an alternate construction with respect to FIG. 1.

Now referring to FIG. 2, a preferred location of a dam 20 and adjacent seal 18 is shown. The dam 20 may be fabricated in several ways, including a process using a polymeric material, photo printed, etched, or otherwise applied to the interior surface 14 of the bottom or top glass 11 of the tile 10. The function of the dam 20 is to prevent the flow of epoxy adhesive into the area of pixels 15 of the tile 10. Flow in the opposite direction can be tolerated, because material is removed along the conventional scribe and break line 17.

The geometry and material properties of the dam 20 may be chosen so that the dam 20 assumes the thickness dimension required for proper liquid crystal performance. This dimension is often ensured by balls or fibers of the appropriate diameter suspended in the liquid crystal material. The dam material may be chosen to conform around any of these balls or fibers located at the dam. Alternatively, the thickness may be less than the dimension required for proper liquid crystal performance. That is, the dam 20 may be thinner than the cell gap.

There are several design approaches to making effective dams 20. One method is to use conformable material (e.g., a polymer elastomer with a height greater than the spacers which determine the cell gap in the AMLCD). In this case, a design for positioning the wet width and its volume can be matched so that the extrusion process fills the cavity between the dam and the nominal position of the wet width. All excess seal material flows in the opposite direction to the dam 20. The SIP and the outer position of the dam 20 are the same location. The compliance of the elastomeric dam allows the cell gap to be filled completely and then compressed.

A second approach utilizes a design with a dam height less than the cell gap. In this case, the flow rate through the space between the dam and the substrate is less than the flow rate in the direction opposite to the dam. Then the nominal position of the wet width may be chosen to fill the space up to the dam 20, and to overflow the dam. The space between the dam 20 and the pixels 15 fills slowly, while the majority of flow is opposite the dam 20.

Figure 2A:
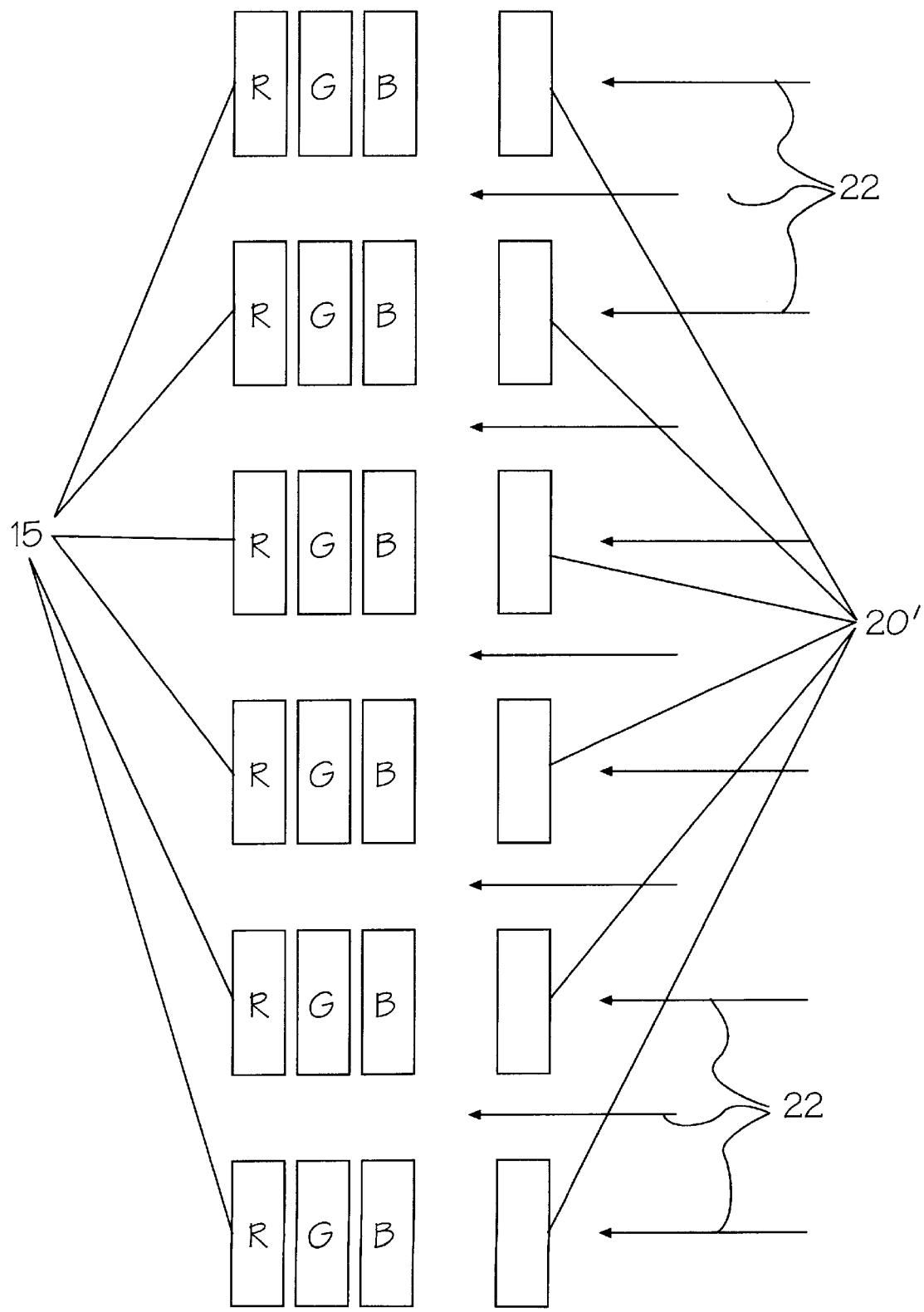
FIG. 2a shows a schematic plan view of a segmented dam construction.

FIG. 2a illustrates a third approach. Segmented dams 20' are used in front of pixels 15. Then, the adhesive flow (arrows 22) is directed around the dams 20' into the areas between pixels 15, and also in the opposite direction to the dams 20'. The nominal position of the wet width is then chosen to allow flow past the dams 20'. The area available between dams 20' is approximately equal to the area where the flow is prevented by the dams 20'.

Dams may preferably be designed and processed in photo polymer technology compatible with basic AMLCD technology. As an alternative method, or in combination with the trench 12, dams can be used to control precision seal geometry. Location may be enhanced by the use of screening technology, disclosed below.

Figure 3:
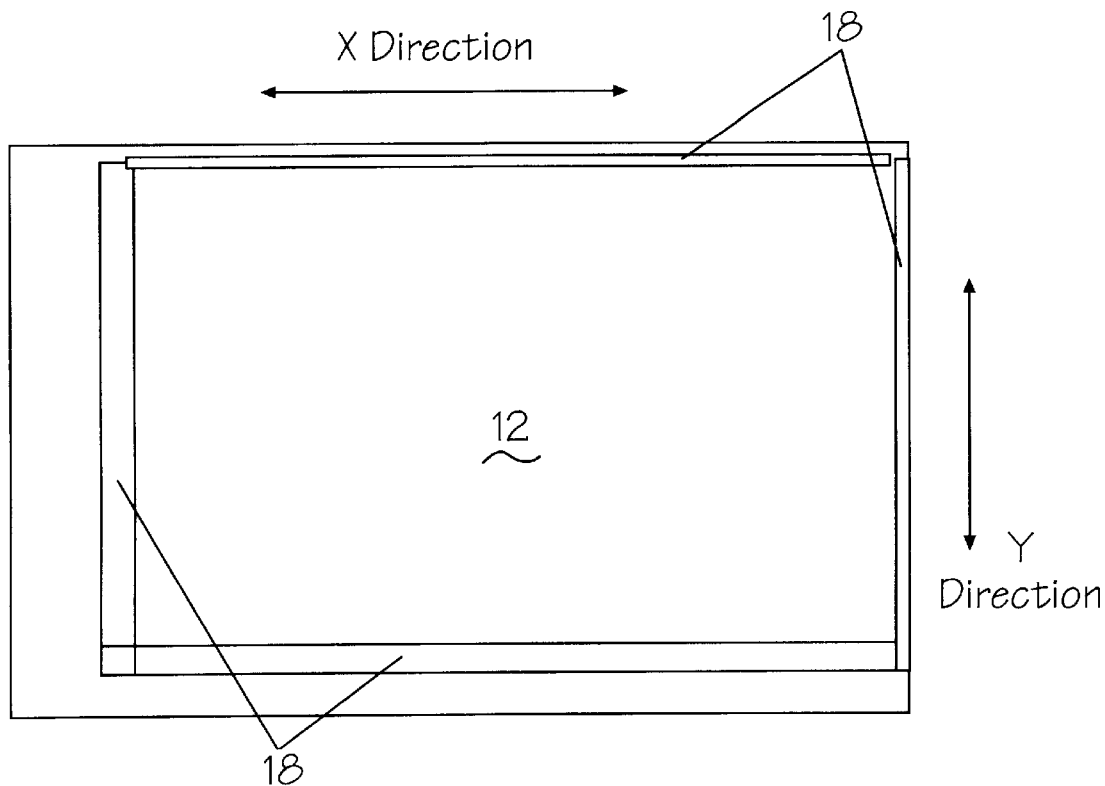
FIG. 3 illustrates a schematic plan view of the seals of an AMLCD display.
Figure 3A:
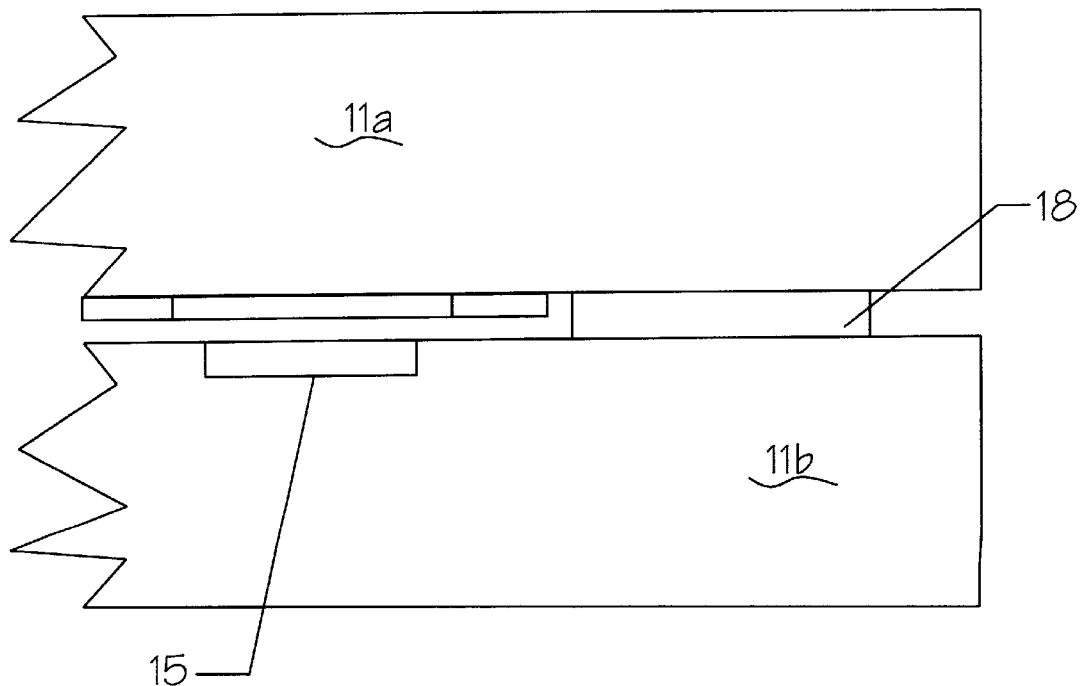
FIG. 3a depicts a schematic side view of the display shown in FIG. 3.

Referring to FIGS. 3 and 3a, there is shown a possible location of seals on the top glass 11a and bottom glass 11b of a tile 12 with a definition of X and Y directions relative to the tile 12. The control of the dimensions and the location of the SIP of the patterns in the screening or masking process may be improved by iterative compensation procedures as discussed above.

A second method is to use two screens rather than one. The first screen or mask is used to apply the sealing material to one of the respective glass members 11a or 11b making up the tile 12. The length direction of the opening in the screen is oriented in the same direction (e.g., the X-direction) as the direction in which the adhesive material is applied to the part. The distortion of the screen is predominantly along the pattern, rather than perpendicular to it. In this case, the location of the line is better than when the squeegee moves perpendicular to the line. The sealing material applied to the other glass member is then applied in the Y direction. The length direction of the opening in this screen or mask corresponds to the application direction. Furthermore, the screen strength is substantially improved in the direction of the squeegee motion, which thus decreases the screen distortion. In this way, the resulting seal is controlled, because the means of applying adhesive material (such as by squeegee) can optimally be oriented with respect to the openings.

Figure 4:
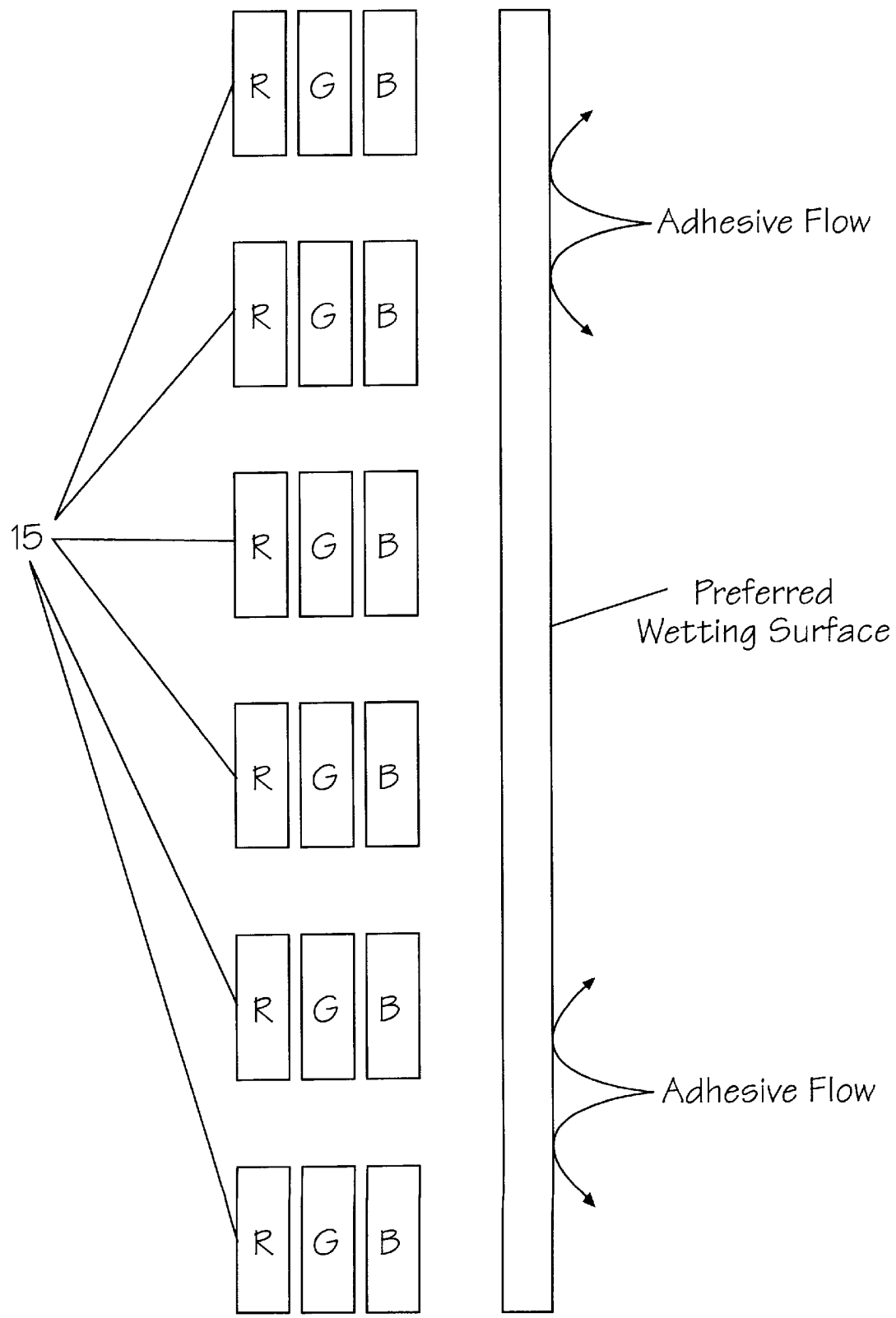
FIG. 4 shows a schematic plan view of an alternate sealant construction for an AMLCD display.

Referring to FIG. 4, another method of controlling the seal inner perimeter is with the use of preferred wetting surface materials. In this method, a preferred wetting material is located adjacent to the pixels 15, proximate to the edge where the controlled seal inner perimeter is desired. In this embodiment, the surface tension of the adhesive causes the adhesive to preferentially follow the path of the wetting surface, rather than continuing its flow into the pixel region.

Figure 4A:
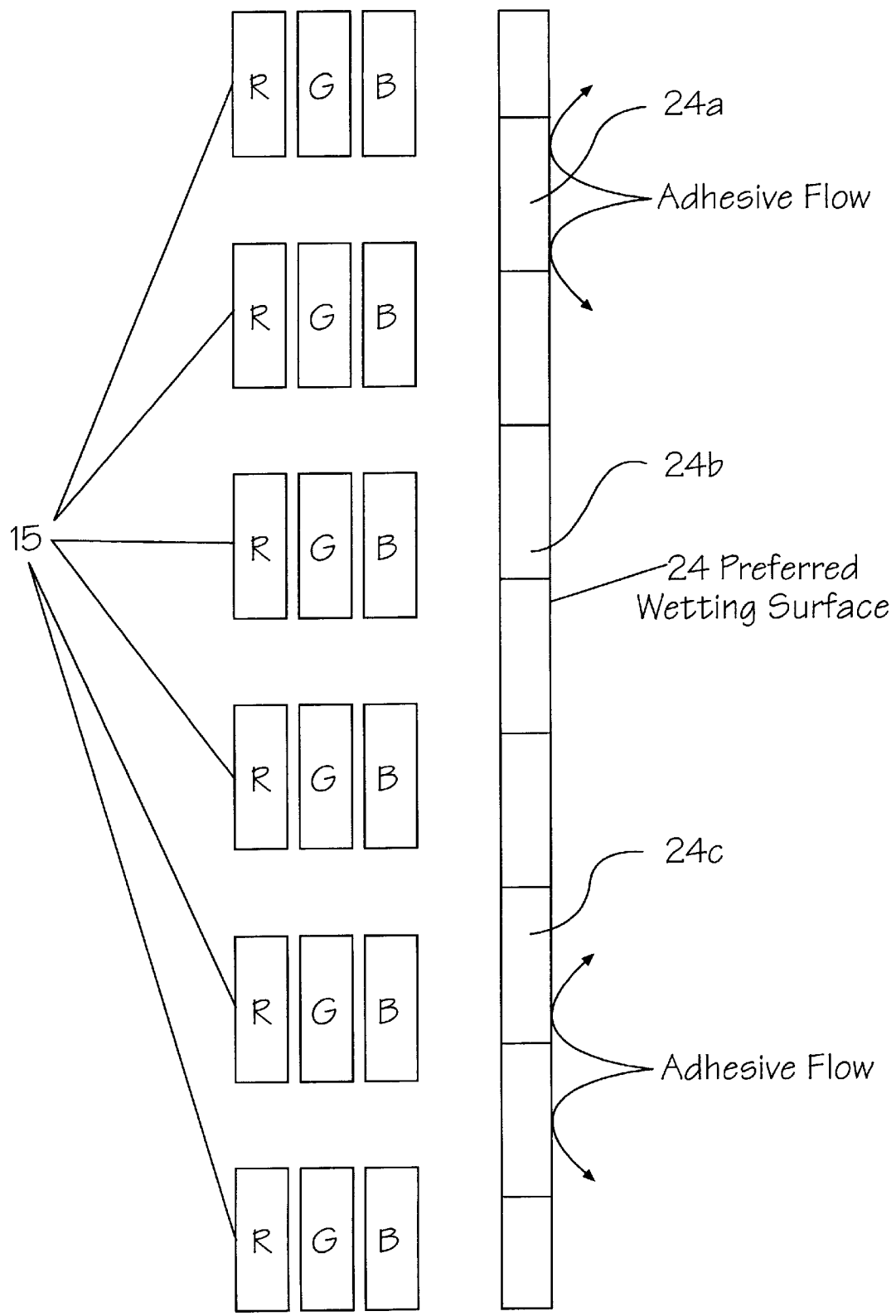
FIG. 4a shows a schematic plan view of an alternate sealant construction for an AMLCD display wherein the sealant wetting surface is discontinuous.

Referring now to FIG. 4a, there is shown an alternate embodiment wherein the wetting surface 24 is discontinuous, consisting of wetting surface segments 24a, 24b and 24c with non-wetted areas therebetween. It should be obvious that numerous different patterns of wettable/non-wettable surface segments could be formed and the invention is not considered limited to the specific pattern chosen for purposes of disclosure.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A tiled, flat-panel display having visually imperceptible seams between its tiles, comprising:

a mosaic of individual, substantially hermetically-sealed LCD tiles disposed adjacent one another on a substrate and having seams therebetween, said individual tiles comprising:

i) a top glass plate and a bottom glass plate, each of said plates having outer edges;

ii) liquid crystal material between said top and said bottom glass plates for providing a plurality of pixels having a predetermined pixel pitch therebetween;

iii) sealing means for containing said liquid crystal material along an outer edge adjacent said seam, said sealing means being disposed between said plurality of pixels and said outer edge and having a width less than said predetermined pixel pitch, said sealing means comprising a flow-directing structure disposed on at least one of said top and said bottom glass plates and extending along said outer, adjacent edge, whereby said flow-directing structure substantially prevents said sealant from encroaching said plurality of pixels; and a cover plate disposed above said individual tiles.

2. The tiled, flat-panel display having visually imperceptible seams between its tiles as recited in claim 1, wherein said flow-directing structure comprises a dam.

3. The tiled, flat-panel display having visually imperceptible seams between its tiles as recited in claim 2, wherein said dam is formed upon at least one of said top and bottom glass plates.

4. The tiled, flat-panel display having visually imperceptible seams between its tiles as recited in claim 1, wherein said flow-directing structure comprises a trench having an outer trench perimeter and defining an inner seal perimeter.

5. The tiled, flat-panel display having visually imperceptible seams between its tiles as recited in claim 4, wherein a volume of said trench is sufficient to contain all of said sealing material flowing past said outer trench perimeter.

6. The tiled, flat-panel display having visually imperceptible seams between its tiles as recited in claim 4, wherein said trench is formed upon at least one of said top and bottom glass plates.

7. A substantially flat-panel, tiled display having substantially imperceptible seams between its tiles, comprising:

a mosaic of individual, substantially hermetically-sealed LCD tiles disposed adjacent one another and having visually imperceptible seams therebetween, said individual tiles having a plurality of pixels and edges, said tiles comprising a TFT substrate and a color filter substrate sealed in position, relative to said TFT substrate, by means of sealing material, said color filter substrate being disposed above said TFT substrate;

a top layer and a passivation layer disposed upon said TFT substrate;

a cover plate disposed above said individual tiles; and a dam defining an inner seal perimeter, formed on said passivation layer, for guiding the flow of sealing material, said dam disposed proximate at least one edge of at least one of said individual tiles, adjacent a plurality of pixels proximate said visually imperceptible seam.

8. The substantially flat panel display in accordance with claim 7, wherein said dam comprises a plurality of intermittent barriers.

9. The substantially flat-panel display in accordance with claim 7, wherein said dam for guiding the flow of sealing material comprises a pattern of preferred wetting surfaces forming an inner seal perimeter for at least one of said tiles.

10. The substantially flat-panel display in accordance with claim 9, wherein a pattern of preferred wetting surfaces is formed upon said TFT substrate.

11. The substantially flat-panel display in accordance with claim 9, wherein a pattern of preferred wetting surfaces is formed upon said color filter substrate.

12. The substantially flat-panel display in accordance with claim 9, wherein a pattern of preferred wetting surfaces is formed between said TFT substrate and said color filter substrate.

13. The substantially flat-panel display in accordance with claim 9, further comprising a top layer and a passivation layer disposed upon said TFT substrate, said pattern of preferred wetting surfaces being formed on said passivation layer.

14. The substantially flat-panel display in accordance with claim 9, wherein said pattern of preferred wetting surfaces comprises a plurality of intermittent wetting surfaces.

15. The substantially flat-panel display in accordance with claim 7, wherein said tiles further comprise a trench forming an inner seal perimeter for at least one of said tiles.

16. The substantially flat-panel display in accordance with claim 7, wherein said tiles further comprise a trench, and a pattern of preferred wetting surfaces forming an inner seal perimeter for at least one of said tiles.

17. A substantially flat panel, tiled display having substantially imperceptible seams between its tiles, comprising:

a mosaic of individual, substantially hermetically-sealed LCD tiles disposed adjacent one another and having visually imperceptible seams therebetween, said individual tiles having a plurality of pixels and edges, said tiles comprising a TFT substrate and a color filter substrate sealed in position, relative to said TFT substrate, by means of sealing material, said color filter substrate being disposed above said TFT substrate;

a top layer and a passivation layer disposed upon said TFT substrate;

a cover plate disposed above said individual tiles; and a trench having an outer trench perimeter and defining an inner seal perimeter, formed on said passivation layer, for guiding the flow of sealing material, said trench disposed proximate at least one edge of at least one of said individual tiles, adjacent a plurality of pixels proximate said visually imperceptible seam.

18. The substantially flat-panel display in accordance with claim 17, wherein said trench comprises a plurality of intermittent cavities.

19. A substantially flat-panel, tiled display having substantially imperceptible seams between its tiles, comprising:

a mosaic of individual, substantially hermetically-sealed LCD tiles disposed adjacent one another and having visually imperceptible seams therebetween, said individual tiles having a plurality of pixels and edges, said tiles comprising a TFT substrate and a color filter substrate sealed in position, relative to said TFT substrate, by means of sealing material, said color filter substrate being disposed above said TFT substrate;

a passivation layer disposed upon said color filter substrate;

a cover plate disposed above said individual tiles; and a dam defining an inner seal perimeter, formed on said passivation layer, for guiding the flow of sealing material, said dam disposed proximate at least one edge of at least one of said individual tiles, adjacent a plurality of pixels proximate said visually imperceptible seam.

20. The substantially flat-panel display in accordance with claim 19, wherein said tiles further comprise a trench, and a pattern of preferred wetting surfaces forming an inner seal perimeter for at least one of said tiles.

21. The substantially flat-panel display in accordance with claim 20, wherein said pattern of preferred wetting surfaces comprises a plurality of intermittent wetting surfaces.

* * * * *